United States Patent
Nelson et al.

(10) Patent No.: US 9,695,353 B2
(45) Date of Patent: Jul. 4, 2017

(54) FOAMED FRACTURING FLUIDS AND METHODS FOR TREATING HYDROCARBON BEARING FORMATIONS

(71) Applicants: Scott Gregory Nelson, Cypress, TX (US); Richard Wheeler, Crosby, TX (US)

(72) Inventors: Scott Gregory Nelson, Cypress, TX (US); Richard Wheeler, Crosby, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 345 days.

(21) Appl. No.: 13/793,787

(22) Filed: Mar. 11, 2013

(65) Prior Publication Data

US 2014/0251625 A1   Sep. 11, 2014

(51) Int. Cl.
    *C09K 8/70*   (2006.01)
    *C09K 8/88*   (2006.01)
    *E21B 43/26*  (2006.01)

(52) U.S. Cl.
    CPC ............ *C09K 8/703* (2013.01); *C09K 8/88* (2013.01); *E21B 43/26* (2013.01); *C09K 2208/34* (2013.01)

(58) Field of Classification Search
    CPC ........... E21B 43/26; C09K 8/703; C09K 8/88; C09K 2208/34
    See application file for complete search history.

(56) References Cited

U.S. PATENT DOCUMENTS

| | | | |
|---|---|---|---|
| 3,370,650 A | 2/1968 | Watanabe |
| 3,408,296 A | 10/1968 | Kuhn et al. |
| 3,710,865 A | 1/1973 | Kiel |
| 3,841,402 A | 10/1974 | Knight et al. |

(Continued)

FOREIGN PATENT DOCUMENTS

| | | |
|---|---|---|
| CN | 102952529 A | 3/2013 |
| EP | 0280341 A1 | 8/1988 |

(Continued)

OTHER PUBLICATIONS

International Search Report and Written Opinion for International Application No. PCT/US2013/047449; International Filing Date Jun. 25, 2013; Issued Sep. 26, 2013 (13 pgs).

(Continued)

*Primary Examiner* — Zakiya W Bates
*Assistant Examiner* — Crystal J Miller
(74) *Attorney, Agent, or Firm* — Cantor Colburn LLP

(57) ABSTRACT

Disclosed herein is a foamed fracturing fluid comprising a carrier fluid; a polymer that is soluble in the carrier fluid; the polymer being a synthetic polymer, wherein the synthetic polymer comprises a labile group that is operative to facilitate decomposition of the synthetic polymer upon activation of the labile group; a foaming agent; and a gas constituent, the synthetic polymer, foaming agent and gas constituent being operative to increase the viscosity of the carrier fluid to about 50 centipoise or greater at 100 $s^{-1}$, the foamed fracturing fluid being operative to reduce friction during a downhole fracturing operation and to transport a proppant during the downhole fracturing operation. A method for treating a hydrocarbon-bearing formation is also disclosed herein.

28 Claims, 4 Drawing Sheets

(56) References Cited

U.S. PATENT DOCUMENTS

| | | | |
|---|---|---|---|
| 3,938,594 | A | 2/1976 | Rhudy et al. |
| 4,144,179 | A | 3/1979 | Chatterji |
| 4,463,810 | A * | 8/1984 | Hill ........................... 166/308.5 |
| 5,711,376 | A * | 1/1998 | Sydansk ................ C09K 8/703 |
| | | | 166/308.6 |
| 6,042,936 | A | 3/2000 | Kempf |
| 6,454,008 | B1 * | 9/2002 | Chatterji et al. ........... 166/308.6 |
| 6,720,290 | B2 * | 4/2004 | England et al. .............. 507/244 |
| 6,734,146 | B2 * | 5/2004 | Chatterji et al. ............. 507/202 |
| 6,767,868 | B2 | 7/2004 | Dawson et al. |
| 6,844,296 | B2 | 1/2005 | Dawson et al. |
| 6,986,391 | B2 | 1/2006 | Funkhouser et al. |
| 7,261,158 | B2 | 8/2007 | Middaugh et al. |
| 7,482,310 | B1 | 1/2009 | Reese et al. |
| 7,530,393 | B2 | 5/2009 | Wood et al. |
| 7,588,085 | B2 * | 9/2009 | Acock et al. .............. 166/308.1 |
| 7,833,949 | B2 * | 11/2010 | Li et al. ......................... 507/211 |
| 7,857,055 | B2 | 12/2010 | Li |
| 8,022,015 | B2 | 9/2011 | Carman et al. |
| 2002/0169085 | A1 | 11/2002 | Miller et al. |
| 2003/0054962 | A1 | 3/2003 | England et al. |
| 2003/0092581 | A1 | 5/2003 | Crews |
| 2003/0207768 | A1 * | 11/2003 | England et al. .............. 507/200 |
| 2005/0039919 | A1 | 2/2005 | Harris et al. |
| 2006/0185850 | A1 | 8/2006 | Segura |
| 2006/0254774 | A1 | 11/2006 | Saini et al. |
| 2007/0044965 | A1 | 3/2007 | Middaugh et al. |
| 2007/0209794 | A1 | 9/2007 | Kaufman et al. |
| 2007/0209795 | A1 | 9/2007 | Gupta |
| 2008/0081771 | A1 | 4/2008 | Lin et al. |
| 2008/0099207 | A1 | 5/2008 | Venditto et al. |
| 2008/0179062 | A1 | 7/2008 | Watkins et al. |
| 2008/0289828 | A1 | 11/2008 | Hutchins et al. |
| 2009/0023613 | A1 * | 1/2009 | Li ........................... C09K 8/528 |
| | | | 507/211 |
| 2009/0075845 | A1 | 3/2009 | Abad et al. |
| 2009/0105097 | A1 | 4/2009 | Abad et al. |
| 2009/0145607 | A1 | 6/2009 | Li |
| 2010/0022418 | A1 | 1/2010 | Milne et al. |
| 2010/0089580 | A1 | 4/2010 | Brannon et al. |
| 2010/0222242 | A1 | 9/2010 | Huang et al. |
| 2011/0053812 | A1 | 3/2011 | Ezell et al. |
| 2011/0067875 | A1 | 3/2011 | Funkhouser et al. |
| 2011/0269651 | A1 * | 11/2011 | Bismarck ................. C04B 28/02 |
| | | | 507/225 |
| 2011/0269904 | A1 | 11/2011 | Bismarck et al. |
| 2012/0006551 | A1 | 1/2012 | Carman et al. |
| 2013/0048283 | A1 | 2/2013 | Makarychev-Mikhailov et al. |
| 2014/0000890 | A1 | 1/2014 | Sun et al. |
| 2014/0000897 | A1 | 1/2014 | Wang et al. |
| 2014/0005080 | A1 | 1/2014 | Ogle et al. |

FOREIGN PATENT DOCUMENTS

| | | |
|---|---|---|
| WO | 0163090 A2 | 8/2001 |
| WO | 2009097286 A1 | 8/2009 |
| WO | 2011135313 A1 | 11/2011 |
| WO | 2011136679 A1 | 11/2011 |
| WO | 2012045155 A1 | 4/2012 |

OTHER PUBLICATIONS

International Search Report and Written Opinion for International Application No. PCT/US2013/047530; International filed Jun. 25, 2013; Issued Sep. 26, 2013 (12 pgs).

International Search Report dated Feb. 26, 2013 for International Application No. PCT/US2012/046460. All references cited in PCT are listed above.

Written Opinion of the International Searching Authority mailed Jul. 12, 2012 for International Application No. PCT/US2012/046460.

International Search Report for International Application No. PCT/US2014/013565; International filed Jan. 29, 2014; Issued May 26, 2014. (5 pgs).

Written Opinion for International Application No. PCT/US2014/013565; International filed Jan. 29, 2014; Issued May 26, 2014. (8 pgs).

Sun, H. et al. "A Novel Nondamaging Friction Reducer: Development and Successful Slickwater Frac Applications" Copyright 2010, Society of Petroleum Engineers; 9 pages.

Office Action dated Dec. 18, 2014, 29 pages, U.S. Appl. No. 13/537,800.

Office Action dated Dec. 18, 2014, 25 pages, U.S. Appl. No. 13/718,864.

Office Action dated Dec. 18, 2014, 30 pages, U.S. Appl. No. 13/718,844.

IPRP dated Jan. 8, 2015, 7 pages, PCT/US2012/046460.

IPRP dated Jan. 8, 2015, 9 pages, PCT/US2013/047449.

IPRP dated Jan. 8, 2015, 9 pages, PCT/US2013/047530.

Office Action dated Dec. 18, 2014, 24 pages, U.S. Appl. No. 13/610,253.

European Search Report, International Application No./Patent No. 12880043.0-1354/2867458, Date of Mailing Jan. 19, 2016, European Patent Office, European Search Report 11 pages.

\* cited by examiner

FOAMED FRACTURING FLUIDS AND METHODS FOR TREATING HYDROCARBON BEARING FORMATIONS

BACKGROUND

Hydraulic fracturing increases fluid (e.g., hydrocarbons, and the like) flow from a subterranean zone by creating new fractures and facilitating connectivity of the existing pores and natural channels contained in the subterranean zone. Hydraulic fracturing is a process by which cracks or fractures in the subterranean zone are created by pumping a fracturing fluid at a pressure that exceeds the parting pressure of the rock. The fracturing fluid creates or enlarges fractures in the subterranean zone and a particulate proppant material suspended in the fracturing fluid may be pumped into the created fracture. This process is also known as "frac-packing". The created fracture continues to grow as more fluid and proppants are introduced into the formation.

The proppants remain in the fractures in the form of a permeable "pack" that serves to hold open or "prop" the fractures open. After placement of the proppant materials, the fracturing fluid may be "broken" and recovered by using a breaker or a delayed breaker system to facilitate a reduction in the viscosity of the fracturing fluid. The reduction in fluid viscosity along with fluid leak-off from the created fracture into permeable areas of the formation allows for the fracture to close on the proppants following the treatment. By maintaining the fracture open, the proppants provide a highly conductive pathway for hydrocarbons and/or other formation fluids to flow into the borehole.

Guar is often used to increase the viscosity of fracturing fluids in order to reduce the amount of wear and/or to facilitate the transport of proppants. As a naturally occurring material, guar is a limited natural resource, the demand for which has increased greatly in recent years. In addition to significant supply limitations, guar-based fracturing fluids are also limited by other significant disadvantages, including but not limited to, the hydration limitations of the guar polymer, formation damage, i.e., undesirable coating of proppant materials and/or formation surfaces with the guar polymer or residue, and instability of the guar polymer at elevated temperatures in certain types of fracturing applications.

It is therefore desirable to provide an alternative to guar-based fracturing fluids, which solves one or more of the above problems associated with these guar-based, fracturing fluids. It is also desirable to provide an alternative to guar-based fracturing fluids whereby the viscosity of the fracturing fluid is controlled.

SUMMARY OF THE DISCLOSURE

Disclosed herein is a foamed fracturing fluid comprising a carrier fluid; a polymer that is soluble in the carrier fluid; the polymer being a synthetic polymer, wherein the synthetic polymer comprises a labile group that is operative to facilitate decomposition of the synthetic polymer upon activation of the labile group; a foaming agent; and a gas constituent, the synthetic polymer, foaming agent and gas constituent being operative to increase the viscosity of the carrier fluid to about 50 centipoise or greater at 100 s$^{-1}$, the foamed fracturing fluid being operative to reduce friction during a downhole fracturing operation and to transport a proppant during the downhole fracturing operation.

Disclosed herein too is a method for treating a hydrocarbon-bearing formation comprising blending a carrier fluid with a polymer, a foaming agent and a gas constituent to form a foamed fracturing fluid, the foamed fracturing fluid having a viscosity of about 50 centipoise or greater at 100 s$^{-1}$; the polymer being a synthetic polymer; and discharging the foamed fracturing fluid into a downhole fracture in the hydrocarbon-bearing formation, wherein the foamed fracturing fluid is operative to reduce friction during a hydrocarbon-bearing treatment operation.

BRIEF DESCRIPTION OF THE DRAWINGS

For a detailed understanding of the present disclosure, references should be made to the following detailed description, taken in conjunction with the accompanying drawings in which like elements have generally been designated with like numerals and wherein.

DESCRIPTION OF EMBODIMENTS

Figure 1:
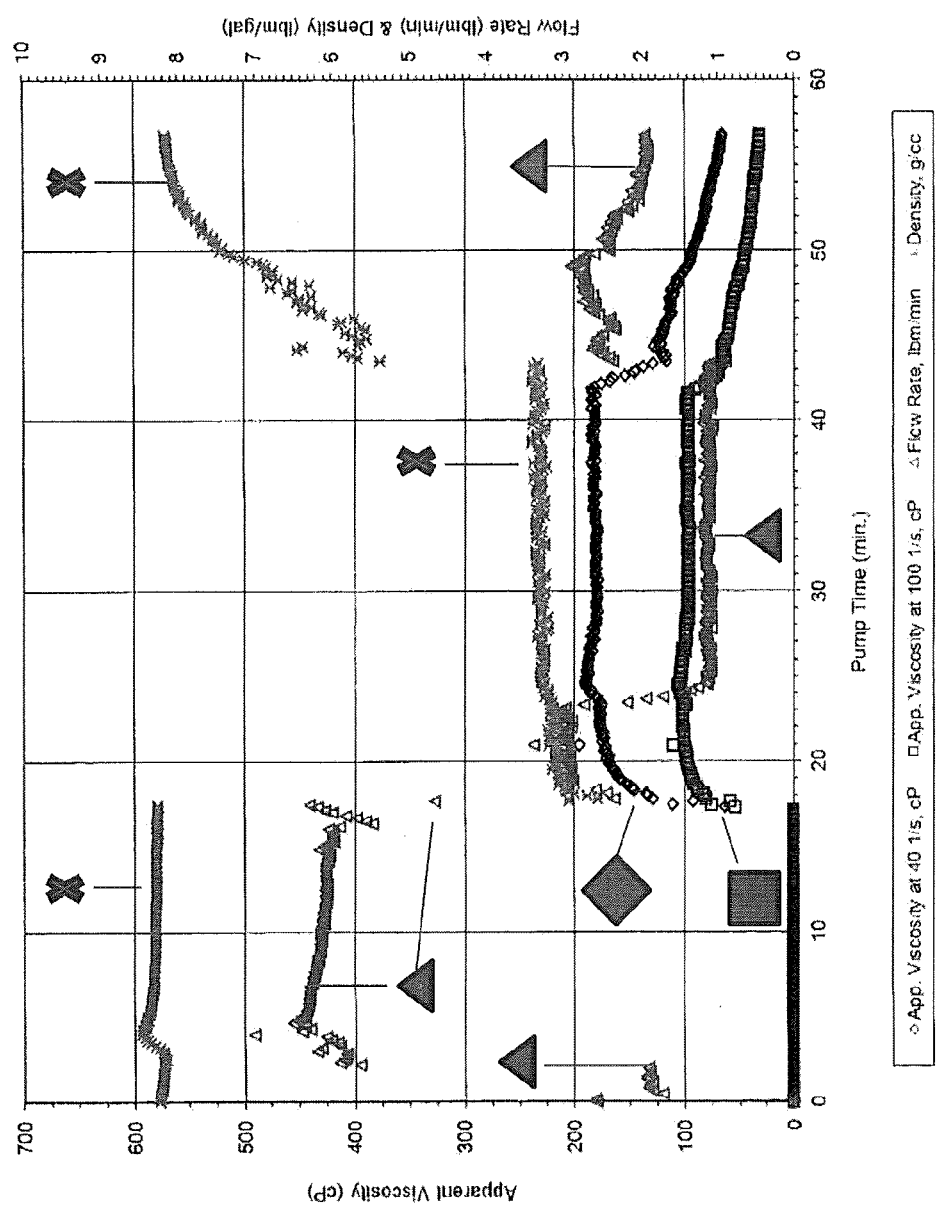
FIG. 1 is a graph depicting the average apparent viscosity versus time and flow rate and density at 150° F. for a foamed fracturing fluid which contains the synthetic polymer, the foaming agent and gas constituent which comprises nitrogen.

Fracturing fluids are used in the stimulation and/or treatment of oil and gas wells. A high molecular weight synthetic polymer is added to a carrier fluid, or base fluid, to increase the viscosity of the carrier fluid, thereby forming a gel. A gas constituent is added to the carrier fluid to form a foamed gel, or a foamed fracturing fluid. The dispersion of the gas into the base fluid in the form of bubbles or droplets controls the viscosity of the base fluid, thereby improving the ability of the resulting foamed fracturing fluid to effectively induce hydraulic fracturing of the formation, and improving the capacity to carry proppants into the formation. The presence of the gas in the foamed fracturing fluid also improves the flowback of the base fluid from the formation and into the wellbore, due to the expansion of the gas once the pressure is reduced at the wellhead at the end of the fracturing operation.

Disclosed herein is a foamed fracturing fluid that comprises a polymer, a foaming agent, a gas constituent and a carrier fluid. In one embodiment, the polymer is a synthetic polymer (i.e., it is a man-made polymer) and can rapidly dissolve, or hydrate, in the carrier fluid thereby increasing the viscosity of the carrier fluid so as to reduce friction between the various components of fracturing equipment used in the hydraulic fracturing process and/or to increase the viscosity of the carrier fluid.

In an exemplary embodiment, the foamed fracturing fluid reduces friction between components of the fracturing equipment during an early stage as well as during subsequent stages of dissolution of the polymer in the carrier fluid.

It also prevents the proppants from settling out of the fracturing fluid (phase separating) during subsequent stages of dissolution of the polymer in the carrier fluid. The ability of the polymer to rapidly dissolve into the carrier fluid minimizes the use of pre-dissolution procedures and hydration equipment, thus reducing capital costs and maintenance costs. This rapid dissolution ability also permits the carrier fluid to transport proppants downhole while permitting them to remain slurried in the carrier fluid (i.e., with reduced settling or falling out of solution) while it is being transported to the fracture. In an exemplary embodiment, the fracturing fluid reaches its maximum viscosity within 10 to 40 seconds after introduction of the polymer into the carrier fluid, which allows slower settling of proppant within the fluids at lower pumping rate, and reduces friction between the various components of the fracturing equipment.

The polymer is soluble in a carrier fluid, for example, an aqueous medium such as water or slickwater to form the fracturing fluid. In an exemplary embodiment, the polymer is an organic water-soluble synthetic polymer (i.e., it is a polymer that is man-made). In addition to the synthetic polymer, the polymer may comprise a naturally occurring polymer. A "naturally occurring" polymer is one that is derived from a living being such as an animal, a plant, a microorganism, or the like. The polymer can therefore comprise a naturally occurring polymer so long as it is blended with or copolymerized with the synthetic polymer.

In one embodiment, the polymer also comprises a labile group that can be decomposed upon activation. The decomposition of the labile group permits a reduction in the viscosity of the fracturing fluid and also permits its removal from the fracture after a conductive path is established through the proppants in the fracture. The conductive path permits the extraction of hydrocarbons from the fracture.

The polymer can comprise a blend of polymers, a copolymer, a terpolymer, an oligomer, a homopolymer, a block copolymer, an alternating block copolymer, a random copolymer, a random block copolymer, a graft copolymer, a star block copolymer, a dendrimer, an ionomer, an elastomer, a polyelectrolyte, or the like, or a combination comprising at least one of the foregoing polymers.

In one embodiment, the polymer may be a linear polymer, a branched polymer or a crosslinked polymer. In another embodiment, the polymer can comprise a blend of two or more synthetic polymers or a copolymer of two or more synthetic polymers. For example, the polymer can comprise a first synthetic polymer and a second synthetic polymer that are blended together or are that are copolymerized together. The copolymerization may involve covalent bonding and/or ionic bonding. In one embodiment, the first synthetic polymer is hydrophilic, while the second synthetic polymer is hydrophobic. In yet another embodiment, the polymer may comprise a copolymer of a synthetic polymer and a naturally occurring polymer, where the naturally occurring polymer can be either hydrophilic or hydrophobic.

In one embodiment, the polymer is a water soluble polymer. Examples of the water soluble polymer are polyacrylates, polyacrylamides, polyvinylacetates, polyvinyl acetamides, polyvinyl alcohols, neutralized and un-neutralized polymeric acids (e.g., neutralized and un-neutralized polyacrylics acids, neutralized and un-neutralized polysulfonic acids, neutralized and un-neutralized polystyrene sulfonic acids, or the like) polydiallyl dimethyl ammonium chlorides, poly(1-glycerol methacrylate)s, poly(2-dimethylaminoethyl methacrylate)s, poly(2-ethyl-2-oxazoline), poly(2-hydroxyethyl methacrylate/methacrylic acid)s, poly(2-hydroxypropyl methacrylate)s, poly(2-methacryloxyethyltrimethylammonium halide)s, poly(2-vinyl-1-methylpyridinium halide)s, poly(2-vinylpyridine N-oxide)s, poly(2-vinylpyridine)s, poly(3-chloro-2-hydroxypropyl-2-methacryloxyethyldimethylammonium chloride)s, or the like, or a combination comprising at least one of the foregoing water soluble polymers.

In one embodiment, the polymer can comprise one or more of the foregoing water soluble polymers and a synthetic polymer that is hydrophobic so long as the resulting polymer is soluble in the carrier fluid. In an exemplary embodiment, the polymer can comprise one or more of the foregoing water soluble polymers and a synthetic polymer that is hydrophobic so long as the resulting polymer is soluble in an aqueous carrier fluid. The foregoing water soluble polymers can be copolymerized or blended with the hydrophobic synthetic polymer.

Examples of hydrophobic synthetic polymers are polyacetals, polyolefins, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, polytetrafluoroethylene, polychlorotrifluoroethylene, polyvinylidene fluoride, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphtalides, polyacetals, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, or the like, or a combination comprising at least one of the foregoing hydrophobic synthetic polymers.

As noted above, the polymer can comprise a blend or a copolymer of a synthetic polymer and a naturally occurring polymer. Examples of naturally occurring polymers include polysaccharides, derivatives of polysaccharides (e.g., hydroxyethyl guar (HEG), carboxymethyl guar (CMG), carboxyethyl guar (CEG), carboxymethyl hydroxypropyl guar (CMHPG), cellulose, cellulose derivatives (i.e., derivatives of cellulose such as hydroxyethylcellulose (HEC), hydroxypropylcellulose (HPC), carboxymethylcellulose (CMC), carboxyethylcellulose (CEC), carboxymethyl hydroxyethyl cellulose (CMHEC), carboxymethyl hydroxypropyl cellulose (CMHPC)), karaya, locust bean, pectin, tragacanth, acacia, carrageenan, alginates (e.g., salts of alginate, propylene glycol alginate, and the like), agar, gellan, xanthan, scleroglucan, or the like, or a combination comprising at least one of the foregoing.

The polymer comprises a labile group that is operative to facilitate decomposition of the polymer upon activation of the labile group. It is desirable for the labile group to be water soluble or otherwise soluble in the carrier fluid. Labile groups include ester groups, amide groups, carbonate groups, azo groups, disulfide groups, orthoester groups, acetal groups, etherester groups, ether groups, silyl groups, phosphazine groups, urethane groups, esteramide groups, etheramide groups, anhydride groups, and any derivative or combination thereof. In some embodiments, the labile links are derived from oligomeric or short chain molecules that include poly(anhydrides), poly(orthoesters), orthoesters, poly(lactic acids), poly(glycolic acids), poly(caprolactones), poly(hydroxybutyrates), polyphosphazenes, poly(carbonates), polyacetals, polyetheresters, polyesteramides, polycyanoacrylates, polyurethanes, polyacrylates, or the like, or a combination comprising at least one of the foregoing oligomeric or short chain molecules. In some embodiments, the labile links may be derived from a hydrophilic polymeric block comprising at least one compound selected from the group consisting of: a poly(alkylene glycol), a poly(alcohol) made by the hydrolysis of polyvinyl acetate), poly(vinyl pyrrolidone), a polysaccharide, a chitin, a chitosan, a protein, a poly(amino acid), a poly(alkylene oxide), a poly (amide), a poly(acid), a polyol, any derivative, copolymer, or combination thereof.

The polymer can be manufactured via emulsion (or inverse emulsion) polymerization to obtain high molecular weights. In emulsion polymerization or inverse emulsion polymerization, the polymers are suspended in a fluid. In one embodiment, the fluid in which the polymer is suspended is water. The manufacturing and use of the polymer in emulsion form makes it possible to be used as a liquid additive thereby simplifying it use in the fracturing fluid.

Depending on the particular labile group, the polymer can be degraded by oxidation, reduction, photo-decomposition, thermal decomposition, hydrolysis, chemical decomposition or microbial decomposition. The rates at which the polymer degrades is dependent on at least the type of labile group, composition, sequence, length, molecular geometry, molecular weight, stereochemistry, hydrophilicity, hydrophobicity, additives and environmental conditions such as temperature, presence of moisture, oxygen, microorganisms, enzymes, pH, and the like.

The synthetic polymer has a number average molecular weight of about 2,000,000 to about 25,000,000 specifically about 10,000,000 to about 20,000,000 grams per mole.

In an exemplary embodiment, the polymer (used in the fracturing fluid) is a linear synthetic polymer and comprises a polyacrylamide. Commercially available synthetic polymers are MaxPerm-20® and MaxPerm-20A® from Baker Hughes, Incorporated.

In an embodiment, the polymer is employed in an amount of about 0.01 to about 20 percent by weight (hereinafter "wt %"), specifically about 0.1 to about 10 wt %, and more specifically about 0.05 to about 5 wt %, based on the total weight of the fracturing fluid.

In one embodiment, it is desirable for the polymer to be soluble in an aqueous carrier fluid. When the polymer comprises a hydrophobic and a hydrophilic portion, it is desirable for the polymer to have an overall structure that lends itself to solubilization in an aqueous carrier fluid. In order to accomplish this, it is desirable for the polymer to have a solubility parameter that is proximate to that of the carrier fluid so that the polymer can rapidly dissolve in the carrier fluid.

The selection of the chemical constituents of the polymer used in a given fracturing application is determined, in part, using the solubility parameter of the chemical constituents. The Hildebrand solubility parameter is a numerical parameter, which indicates the relative solvency behavior of a polymer or a combination of polymers in a specific solvent. Here, the solvent is the carrier fluid. The solubility parameter is derived from the cohesive energy density of the polymer. From the heat of vaporization in calories per cubic centimeter of liquid, the cohesive energy density (c) can be derived by the following equation (1):

$$c = \frac{\Delta H - RT}{V_m} \quad (1)$$

where c=cohesive energy density; $\Delta H$=heat of vaporization, R=gas constant, T=temperature; and $V_m$=molar volume. In general terms, when two materials having similar cohesive energy density values, the solubility parameter values are proximate to each other, since the solubility parameter is the square root of the cohesive energy density. Two materials are considered to be miscible with one another when they have similar solubility parameters. By tailoring the polymer structure (i.e., by combining the appropriate amount of a hydrophillic polymer with a hydrophobic polymer) the solubility parameter of the polymer can be tailored to be proximate to that of a particular carrier fluid.

In metric units, the solubility parameter ($\delta$) can be calculated in calories per cubic centimeter in metric units ($cal^{1/2}$ $cm^{-3/2}$). In SI units, the solubility parameter is expressed is megapascals ($MPa^{1/2}$). The conversion of the solubility parameter from SI units to metric units is given by the equation (2):

$$\delta(MPa^{1/2})=2.0455\times\delta(cal^{1/2}cm^{-3/2}) \quad (2)$$

The solubility parameter can be used to predict the solvency of a particular combination of polymers (i.e., copolymers or blends of polymers) in a solvent. A solvent will generally swell the polymer when the solubility parameter is proximate to that of the polymer. The solubility parameter of the polymer can be calculated based on the relative weight fractions of each constituent of the polymer according to equation (3):

$$\delta_{polymer}=w_1\delta_1+w_2\delta_2 \quad (3)$$

where $\delta_{polymer}$ is the solubility parameter of the copolymer or blend of polymers, $\delta_1$ is the solubility parameter the hydrophilic polymer, $w_1$ is the weight fraction of the hydrophilic polymer, $\delta_2$ is the solubility parameter of the hydrophobic polymer and $w_2$ is the weigh fraction of the hydrophobic polymer. In one embodiment, the solubility parameter of the carrier fluid can be tailored to be proximate to that of the combination of polymers if so desired.

In an embodiment, the solubility parameter of the polymer is within about 25% of the solubility parameter of the carrier fluid. In another embodiment, the solubility parameter of the synthetic polymer is within about 20% of the solubility parameter of the carrier fluid.

The carrier fluid solvates the polymer and in addition transports the proppant materials downhole to the hydrocarbon bearing formation. The carrier fluid is a liquid carrier that is generally suitable for use in hydrocarbon (i.e., oil and gas) producing wells. In an embodiment, the carrier fluid is an aqueous solution. In another embodiment, the carrier fluid may be slickwater. Slickwater, for example, has a viscosity of less than 3 centipoise. Water is generally a major component by total weight of the carrier fluid. The water is potable, i.e., drinkable, or non-potable. In an embodiment, the water is brackish or contains other materials that may be present in water found in or near oil fields. In another embodiment, the carrier fluid comprises a salt such as an alkali metal or alkali earth metal salt (e.g., $NaCO_3$, NaCl, KCl, CaCl$_2$, and the like) in an amount of from about 0.1 wt % to about 10 wt %, based on the total weight of the carrier fluid. In still yet another embodiment, the carrier fluid is recycled fracturing fluid water or its residue.

The foamed fracturing fluid generally comprises the carrier fluid in an amount of about 10 to about 80 volume %, based upon the total weight of the foamed fracturing fluid. In an exemplary embodiment, the fracturing fluid comprises the carrier fluid in an amount of about 20 to about 60 volume %, based upon the total weight of the foamed fracturing fluid.

The foamed fracturing fluid further comprises a foaming agent. In one embodiment, the foaming agent is at least one surfactant. Examples of the foaming agent are non-ionic surfactants, cationic surfactants, anionic surfactants, amphoteric/zwitterionic surfactants, and mixtures thereof. Examples of non-ionic surfactants include, but are not limited to, alkoxylated alcohols or ethers, alkyl ethoxylates, alkylamido ethoxylates, alkylamine ethoxylate, alkyl glucosides, alkoxylated carboxylic acids, sorbitan derivatives where the alkyl chain length varies from 8 to 24, for example, nonylphenol ethoxylate, alkyl ethoxylates, oleyl carboxylic diethylamides, and the like and mixtures thereof. Examples of cationic surfactants include, but are not limited to, monoalkyl quaternary amines such as cocotrimonium chloride, cetyltrimonium chloride, stearyltrimonium chloride, soyatrimonium chloride, and behentrimonium chloride, dialkyl quaternary amines such as dicetyldimethyl ammonium chloride, dicocodimethyl ammonium chloride and distearyldimethyl ammonium chloride, and the like and mixtures thereof. Examples of anionic surfactants include, but are not limited to, fatty carboxylates, alkyl sarcosinates, alkyl phosphates, alkyl sulfonate, alkyl sulfates and the like and mixtures thereof. Examples of amphoteric/zwitterionic surfactants include, but are not limited to alkyl betaines, alkylamido propyl betaines, alkylampho acetates, alkylamphopropionates, alkylamidopropyl hydroxysultaines and the like and mixtures thereof. In an exemplary embodiment, the foaming agent is an olefinic sulfate, olefinic sulfonate, ethoxylated sulfate, cocoamidopropyl dimethyl ammonium acetate (betaine), coco betaine, butoxyethanol and the like, or a combination comprising at least one of the foregoing. In another embodiment, the foaming agent comprises a blend of surfactants, or at least one surfactant and at least one co-surfactant. Examples of the co-surfactant are organic solvents such as ethylene glycol monobutyl ether, isopropyl alcohol, methanol, glycerol, ethylene glycol, mineral oil, and the like, or a combination comprising at least one of the foregoing.

The foamed fracturing fluid generally comprises the foaming agent in an amount of about 0.05 to about 5 volume %, based upon the total weight of the foamed fracturing fluid. In an exemplary embodiment, the fracturing fluid comprises the foaming agent in an amount of about 0.1 to about 2 volume %, based upon the total weight of the foamed fracturing fluid.

The foamed fracturing fluid further comprises a gas constituent. In one embodiment, the foamed fracturing fluid is formed injecting the liquid phase of the foamed fracturing fluid, e.g., the polymer, foaming agent and carrier fluid, concomitantly with a gas. Examples of the gas constituent are air, nitrogen, carbon dioxide, natural gas and the like, or mixtures thereof or a combination comprising at least one of the foregoing. In one embodiment, the gas constituent is nitrogen.

The foamed fracturing fluid generally comprises the gas constituent in an amount of about 20 to about 90 volume %, based upon the total weight of the foamed fracturing fluid. In an exemplary embodiment, the fracturing fluid comprises the gas constituent in an amount of about 40 to about 85 volume %, based upon the total weight of the foamed fracturing fluid.

As noted above, the fracturing fluid is a foam. As used herein, a foamed, or energized, fracturing fluids in any stable mixture of a gas phase and a liquid phase, where the gas phase is the gas constituent and the liquid is all of the components of the foamed fracturing fluid except the gas phase. The foam quality is the ratio of the volume of the gas to the volume of the liquid. In one embodiment, the foam quality of the foamed fracturing fluid is between about 52% and about 90%. In another embodiment, the foam quality of the foamed, or energized, fracturing fluid is equal to or greater than about 52%. In yet another embodiment, the foam quality of the foamed, or energized, fracturing fluid is below about 52%. In an embodiment, the fracturing fluid is a foamed slurry, gel, or an emulsion, e.g., hydrogel. As used herein, the term "emulsion" refers to a mixture of two or more normally immiscible liquids which results in a two-phase colloidal system wherein a liquid dispersed phase is dispersed in a liquid continuous phase. In an embodiment, the fracturing fluid is an oil-in-water emulsion. As used herein, the term "slurry" refers to a thick suspension of solids in a liquid. As used herein, the term "gel" refers to a solid, jelly-like material. In one embodiment, the gels are mostly liquid. Their solid-like behavior is the result of the formation of a three-dimensional crosslinked network within the liquid wherein the liquid molecules are dispersed in a discontinuous phase within a solid continuous phase. In one embodiment, the fracturing fluid is a foamed slurry or a foamed gelled slurry.

The foamed fracturing fluid is characterized by one or more rheological properties. Such rheological properties include foam quality (as discussed above), foam height and foam half-life. The rheological properties are suitably selected for the particular hydraulic fracturing application The foam height is the measure of the initial height of the foam, for example, according to the Ross-Miles test, in which foam is created by allowing the liquid phase to fall over a standardized height in a partially filled container. In one embodiment, the foamed fracturing fluid has a foam height of from about 100 ml to about 900 ml, specifically about 200 ml to about 800 ml, more specifically about 400 ml to about 750 ml.

The half-life of the foamed fracturing fluid is a measurement of the lifetime of the foamed fracturing fluid. The foam half-life is the time after which the maximum volume of foam is reduced by a factor of two. In one embodiment, the foamed fracturing fluid has a half-life of about 3 to about 120 minutes, specifically about 10 to about 60 minutes, more specifically about 15 to about 50 minutes. In another embodiment, the half-life of the foamed fracturing fluid is at least about 10 minutes or greater.

In an embodiment, the fracturing fluid further comprises a proppant, i.e., proppant materials or particulate materials, which is carried into the hydrocarbon formation by the fracturing fluid and remain in the fracture created, thus propping open the fracture when the fracturing pressure is released and the well is put into production. Examples of proppant materials include sand, resin coated sands, plastic or plastic composite such as a thermoplastic or thermosetting composite or a resin or an aggregate containing a binder, walnut shells, sintered bauxite, glass beads, ceramic materials, synthetic organic particles such as, for example, nylon pellets, naturally occurring materials, or the like, or a combination comprising at least one of the foregoing proppant materials. Suitable proppants further include those set forth in U.S. Patent Publication No. 2007/0209794 and U.S. Patent Publication No. 2007/0209795, herein incorporated by reference.

The fracturing fluid generally comprises the proppant in an amount of about 1% to about 60 wt %, specifically about 1% to about 40 wt %, based upon the total weight of the fracturing fluid.

As noted above, the polymer may be crosslinkable. In an embodiment, the polymer is crosslinked during a fracturing operation. In another embodiment, the polymer is a co-polymer with cross-linkable monomers. Crosslinking the fracturing fluid further increases the viscosity of the carrier fluid, traps proppant materials and prevents settling of proppant materials.

Any suitable crosslinking agent is used to crosslink the polymer. Non-limiting examples of crosslinking agents include crosslinking agents comprising a metal such as boron, titanium, zirconium, calcium, magnesium, iron, chromium and/or aluminum, as well as organometallic compounds, complexes, ions or salts thereof, or a combination comprising at least one of the foregoing. Non-limiting examples of such metal-containing crosslinking agents include: borates, divalent ions such as $Ca^{2+}$, $Mg^{2+}$, $Fe^{2+}$, $Zn^{2+}$ and salts thereof; trivalent ions such as $Al^{3+}$, $Fe^{3+}$ and salts thereof; metal atoms such as titanium or zirconium in the +4 oxidation (valence) state. Crosslinking increases the molecular weight and is particularly desirable in high-temperature wells to avoid decomposition, or other undesirable effects of high-temperature applications.

In an embodiment, the crosslinking agent is included in the fracturing fluid in an amount of from about 0.01 wt % to about 2.0 wt %, specifically about 0.02 wt % to about 1.0 wt % of the fracturing fluid, based on the total weight of the fracturing fluid.

In an embodiment, the crosslinked foamed fracturing fluid has a viscosity of about 50 to about 3000 centipoise at 100 $s^{-1}$, specifically about 100 to about 2500 centipoise at 100 $s^{-1}$, and more specifically about 300 to about 1200 centipoise at 100 $s^{-1}$.

In an embodiment, the fracturing fluid further comprises a breaking agent to activate the labile group and facilitate decomposition of the polymer. Breaking agents "break" or diminish the viscosity of the fracturing fluid so that the fracturing fluid is more easily recovered from the formation during cleanup, e.g., using flowback. Breaking agents include oxidizing agents (or oxidizers), reducing agents, enzymes, or acids. Breaking agents reduce the polymer's molecular weight by the action of an acid, an oxidizer, an enzyme, or some combination of these on the polymer itself. Non-limiting examples of breaking agents include persulfates such as ammonium persulfate, sodium persulfate, potassium persulfate, bromates such as sodium bromate and potassium bromate, periodates, peroxides such as calcium peroxide, hydrogen peroxide, bleach, sodium perchlorate and organic percarboxylic acids or sodium salts, organic materials such as enzymes, or the like; chlorites, or the like, or a combination comprising at least one of the foregoing breaking agents. Breaking agents can be introduced into the fracturing fluid in live form or in encapsulated form.

In one embodiment, the breaking agent comprises an oxidizing agent and is devoid of a reducing agent. The oxidizing agent facilitates the decomposition of the polymer with a consequent reduction in viscosity of the fracturing fluid. The reducing agent accelerates the decomposition rate of the polymer beyond the rate facilitated by a breaking agent that comprises only an oxidizing agent. In another embodiment, the breaking agent comprises a reducing agent and is devoid of an oxidizing agent.

In one embodiment, the breaking agent comprises both an oxidizing agent and a reducing agent. By varying the ratio of the oxidizing agent and the reducing agent, the rate of decomposition of the polymer can be controlled. In one embodiment, by varying the rate of addition of the oxidizing agent and/or the reducing agent to the hydrocarbon formation over time, the rate of decomposition of the polymer and the rate of viscosity reduction of the fracturing fluid in the hydrocarbon formation may be adjusted. The use of both an oxidizing agent and a reducing agent in a breaking agent thus permits greater control over the viscosity reduction characteristics of a fracturing fluid that contains only the oxidizing agent or the reducing agent. In this way, rapid and easy adjustments of the fluid viscosity of the synthetic polymer may be made.

The oxidizing agent promotes decomposition of the labile group of the synthetic polymer. Examples of the oxidizing agent include any of the foregoing breaking agents, earth metal alkali oxidizing compounds, brominated or bromate oxidizing compounds such as sodium bromate, or a combination comprising at least one of the foregoing. In an embodiment, the oxidizing agent is effective to break or degrade the fracturing fluid at downhole or application temperatures greater than or equal to about 275° F., specifically at temperatures of about 275° F. to about 400° F. In an exemplary embodiment, the oxidizing agent is sodium bromate.

In an embodiment, only the oxidizing agent is included in the fracturing fluid in an amount of from about 0.001 wt % to about 5 wt %, specifically from about 0.005 wt % to about 2 wt %, more specifically from about 0.02 wt % to about 1.2 wt %, based on the total weight of the fracturing fluid.

In one embodiment, the fracturing fluid further comprises a reducing agent. As noted above, the reducing agent accelerates the rate of decomposition of the polymer thus bringing about a more rapid reduction in viscosity of the fracturing fluid. Examples of the reducing agent include sodium erythorbate, iron sulfate, oxalic acid, formic acid, ascorbic acid, erythorbic acid, a compound comprising a metal ion wherein the metal ion is a copper ion, an iron ion, a tin ion, a manganese ion or a sulfur ion such as thioglycol or a combination comprising at least one of the foregoing. In one embodiment, a fracturing fluid that contains both an oxidizing agent and a reducing agent reduces the temperature of decomposition of the polymer to a much lower temperature than that which would be accomplished by a fracturing fluid that contains either an oxidizing agent or a reducing agent.

In an embodiment, the reducing agent, in combination with the oxidizing agent, is effective to break, or degrade, the synthetic polymer in the fracturing fluid at downhole or application temperatures of less than or equal to about 275° F., specifically about 200° F. to about 275° F. When both an oxidizing agent and a reducing agent are used in the fracturing fluid, the amount of the oxidizing agent is reduced relative to the amount of oxidizing agent used in a fracturing fluid that contains only the oxidizing agent and not the reducing agent.

When both the oxidizing agent and the reducing agent are present in the fracturing fluid, the oxidizing agent is included in the fracturing fluid in an amount of from about 0.001 wt % to about 0.5 wt %, specifically from about 0.005 wt % to about 0.2 wt %, more specifically from about 0.02 wt % to about 0.12 wt %, based on the total weight of the fracturing fluid.

In an embodiment, the reducing agent is included in the fracturing fluid in an amount of from about 0.0006 wt % to about 0.12 wt %, specifically about 0.001 wt % to about 0.06 wt %, more specifically about 0.002 wt % to about 0.012 wt %, based on the total weight of the fracturing fluid. In another embodiment, the weight ratio of the oxidizing agent to the reducing agent is about 0.1:1 to about 100:1, specifically about 1:1 to about 20:1, more specifically about 4:1 to about 12:1.

In an embodiment, the breaking agent is used to activate the controlled decomposition of the polymer. In an embodiment, the breaking agent is added to the fracturing fluid to instantly begin reducing the viscosity of the fracturing fluid. In another embodiment, the breaking agent is already present in the fracturing fluid and is activated by some external or environmental condition. In an embodiment, an oilfield breaking agent is used to break the fracturing fluid using elevated temperatures downhole. For example, the breaking agent may be activated at temperatures of 50° C. or greater.

In an embodiment, the fracturing fluid further comprises other additives as desired and needed depending upon the particular conditions of the fracturing operation. Non-limiting examples of such additives include pH agents, buffers, mineral, oil, alcohol, biocides, clay stabilizers, surfactants, viscoelastic surfactants, emulsifiers, non-emulsifiers, scale-inhibitors, fibers, surface tension reducers, fluid loss control agents and combinations comprising at least one of the foregoing additives.

In an exemplary embodiment, the fracturing fluid further may comprise other additives as desired for a particular application. Examples of such additives include, but are not limited to, any of the foregoing additives, clay control agents, one or more of the foregoing crosslinking agents, buffers, and breaker catalysts.

A clay control agent is used to control and prevent clay swelling. Examples of clay control agents include ammonium chloride, tetramethyl ammonium chloride diallyl dimethyl ammonium chloride, choline chloride, potassium chloride, sodium chloride, and quaternary amine.

In an embodiment, the clay control agent is included in the fracturing fluid in an amount of from about 0.01 wt % to about 2 wt %, specifically about 0.02 wt % to about 1 wt %, more specifically about 0.05 wt % to about 0.1 wt %, based on the total weight of the fracturing fluid.

A breaker catalyst is used to catalyze, or activate, the breaking or oxidizing agent. An example of a breaker catalyst is acetyl triethyl citrate.

In an embodiment, the breaker catalyst is included in the fracturing fluid in an amount of from about 0.0011 wt % to about 1.1 wt %, specifically about 0.011 wt % to about 0.55 wt %, more specifically about 0.022 wt % to about 0.22 wt %, based on the total weight of the fracturing fluid.

A buffer is used to maintain the pH of the fracturing fluid. Examples of buffers include formic acid and acetic acid.

In an embodiment, the buffer is included in the fracturing fluid in an amount of from about 0.001 wt % to about 1 wt %, specifically about 0.01 wt % to about 0.5 wt %, more specifically about 0.05 wt % to about 0.2 wt %, based on the total weight of the fracturing fluid.

In one embodiment, in one method of manufacturing the fracturing fluid, the polymer and foaming agent are added to the carrier fluid to form a liquid phase, and the gas constituent is added to the liquid phase, in amounts which are effective to increase the viscosity of the carrier fluid and liquid phase. Other additives such as the proppant, surfactants, breaking agents, and the like, may be present in the carrier fluid or liquid phase either prior to the addition of the polymer or may be added to the carrier fluid after the addition of the polymer.

The polymer rapidly dissolves into the carrier fluid increasing its viscosity. The increase in viscosity indirectly reduces friction between components of the fracturing equipment and reduces settling of the proppants in the carrier fluid as the fracturing fluid travels to the fracture in the subterranean zone. In an embodiment, the viscosity of the carrier fluid is increased by about 100% to about 900% in about 10 to about 100 seconds upon introduction of the polymer to the carrier fluid. In another embodiment, the viscosity of the carrier fluid is increased by about 500% to about 800% in about 20 to about 90 seconds upon introduction of the polymer to the carrier fluid. In yet another embodiment, the viscosity of the carrier fluid is increased by about 550% to about 750% in about 70 to about 100 seconds upon introduction of the polymer to the carrier fluid.

In an embodiment, the fracturing fluid, in an uncrosslinked state or prior to crosslinking and prior to introduction of the foaming agent and/or constituent gas, has a viscosity of about 5 to about 50 centipoise, specifically about 6 to about 30 centipoise, and more specifically about 7 to about 20 centipoise, upon introduction of the polymer to the carrier fluid. In another embodiment, the viscosity of the carrier fluid begins increasing upon introduction of the synthetic polymer to the carrier fluid. Although not wishing to be bound by theory, it is thought that the polymer increases the viscosity of the carrier fluid due to not only the molecular weight and structure of the polymer itself but also due to the formation of a network of physical bonds (e.g., hydrogen bonds or ionic bonds) between the polymers, resulting in a gel-like fluid, without crosslinking.

In one embodiment, the average apparent viscosity of the linear (uncrosslinked) foamed fracturing fluid, including the synthetic polymer, carrier fluid, gas constituent and foaming agent, at $40\ s^{-1}$ is greater than about 50 cP, specifically about 50 to about 1000 cP, more specifically about 100 to about 500 cP. In another embodiment, the average apparent viscosity of the linear (uncrosslinked) foamed fracturing fluid at $100\ s^{-1}$ is greater than about 50 cP, specifically about 50 to about 800 cP, specifically about 100 to about 400 cP.

In one method of using the foamed fracturing fluid, when the polymer is added to the carrier fluid, the polymer undergoes rapid dissolution upon contacting the carrier fluid. The foamed fracturing fluid, including the polymer, foaming agent and gas constituent, is pumped downhole almost as soon as the polymer is introduced into the carrier fluid. Because the polymer undergoes rapid hydration upon introduction into the carrier fluid, the fracturing fluid is immediately pumped downhole. The rapid hydration of the polymer by the carrier fluid, as well as the dispersion facilitated by the foaming agent and gas constituent, promotes an increase in the viscosity of the foamed fracturing fluid as it is pumped thereby reducing friction between the various mechanical components (e.g., components of the drilling and fracturing equipment) as it travels downhole. As the foamed fracturing fluid travels downhole, the increase in viscosity of the fracturing fluid allows the foamed fracturing fluid to be pumped at a lower rate without significant settling of the proppants.

The foamed fracturing fluid generally reaches its maximum viscosity when it penetrates the fracture. Once in the fracture, the proppants present in the foamed fracturing fluid are disposed in the fracture and are used to prop open the fracture. When the fracture is supported by the proppants, the labile groups in the foamed fracturing fluid are activated to decompose the polymer in the foamed fracturing fluid. The breaking agent comprising the oxidizing agent and the reducing agent facilitate the decomposition of the polymer. In one embodiment the oxidizing agent and the reducing agent are simultaneously added to the fracturing fluid after the polymer has crosslinked. In another embodiment, the oxidizing agent is first added to the foamed fracturing fluid followed by the reducing agent. In yet another embodiment, the oxidizing agent and the reducing agent are added sequentially in an alternating fashion to facilitate decomposition control and viscosity control. In still yet another embodiment, the crosslinking agent and the oxidizing agent and/or reducing agent are added sequentially in an alternating fashion to facilitate crosslinking control and decomposition and viscosity control. The decomposition of the foamed fracturing fluid causes a reduction in its viscosity, which permits its removal from the fracture. The removal of the foamed fracturing fluid from the fracture leaves behind a conductive path way in the proppants through which hydrocarbons may be removed from the fracture.

The polymer used in the foamed fracturing fluid has a number of advantages over other commercially available polymers that are presently used in fracturing fluids. Since the polymer is synthetic (i.e., man-made) is not subject to some of the production constraints of naturally occurring polymers. It undergoes rapid dissolution when mixed with the carrier fluid. It exhibits a maximum viscosity at ambient temperature of equal to or greater than about 8 centipoise after about 30 seconds following the introduction of the polymer into the carrier fluid. The ability of the polymer to rapidly dissolve in the carrier fluid causes the fracturing fluid to reach about 85% or greater of the maximum viscosity at about 45° F. after about 15 seconds.

In another embodiment, the foamed fracturing fluid comprises a breaking agent, which will break the polymer chains and significantly reduce the fluid viscosity to less than 10 centipoise at temperature equal to or above 100° F.

The foamed fracturing fluid is formed by first pumping the carrier fluid along with the other non-gaseous constituents, e.g., the polymer and foaming agent, of the fracturing fluid downhole. The gas constituent is then introduced downhole into the emulsion or slurry of the carrier fluid and other non-gaseous constituents, forming a foamed fracturing fluid.

The pump rate at which the gas constituent is pumped downhole is between about 1 barrel/min to about 100 barrels/min, specifically between about 2 barrels/min to about 80 barrels/min, more specifically between about 5 barrels/min to about 60 barrels/min.

In another embodiment, in one method for treating a hydrocarbon-bearing formation the carrier fluid is blended with a synthetic polymer, a foaming agent and a gas constituent to form a foamed fracturing fluid, the foamed fracturing fluid having a viscosity of about 50 centipoise or greater at 100 $s^{-1}$; the polymer being a synthetic polymer; and discharging the foamed fracturing fluid into a downhole fracture in the hydrocarbon-bearing formation, wherein the foamed fracturing fluid is operative to reduce friction during a hydrocarbon-bearing treatment operation. Following the blending, the foamed fracturing fluid is discharged into a downhole fracture in the hydrocarbon-bearing formation. The foamed fracturing fluid acts to reduce friction between components of the drilling and fracturing equipment during a hydrocarbon-bearing treatment operation and/or to increase the viscosity of the carrier fluid, thereby facilitating fracturing of the formation, effective transport of proppants and/or flowback and recovery of the foamed fracturing fluid.

In an embodiment, the carrier fluid is discharged into the hydrocarbon-bearing formation, i.e., downhole, and the synthetic polymer, foaming agent, gas constituent and optional additives are introduced into the carrier fluid downhole.

The invention is further described by the following non-limiting examples.

EXAMPLES

Example 1

This example was conducted to show the half-life of foamed hydraulic fracturing fluids which contain the synthetic polymer. In this example, hydraulic foamed fracturing fluids comprising the synthetic polymer disclosed herein were compared with hydraulic foamed fracturing fluids which use guar, a naturally occurring and commercially available polymer. The polymer is a synthetic polymer and comprises a polyacrylamide. It is commercially available as MaxPerm-20® from Baker Hughes, Incorporated. The carrier fluid is water. Three different foaming agents were also compared. FAW™-1 and FAW™-22 are coco betaine surfactants commercially available from Baker Hughes, Incorporated. FAW™-4 is an olefinic sulfonate surfactant commercially available from Baker Hughes, Incorporated. FAW™-22 is another coco betaine surfactant commercially available from Baker Hughes, Incorporated. The gas constituent was air. The foamed fracturing fluids containing the synthetic polymer and the foamed fracturing fluids containing guar are linear (uncrosslinked) foamed gels.

For this example, the synthetic polymer MaxPerm-20®, having a viscosity of 15 cP, and the foaming agent were dissolved in water and the foaming agent to form the liquid phase. The liquid phase was injected concomitantly with air as shown in the Table 1 and the foam height, volume percent air and half-life measurements were made at ambient temperature.

In the comparative samples, guar, having a viscosity of 16.5 cP, and the foaming agent were dissolved in water to form the liquid phase. The liquid phase was injected concomitantly with the air gas constituent as shown in the Table 1 and the foam height, volume percent air and half-life measurements were made at ambient temperature.

Foam is generated by introducing into a container the base fluid and foaming agent. A Waring Blender is then activated for a period of about 1 minute at very high shear rates allowing air to be admixed into the solution, producing a foam. The foam that is generated is then transferred to a graduated cylinder where volumetric measurements are conducted. The foam height measurements were made at ambient temperature using a graduated cylinder. The volume percent of the air gas constituent measurements were made at ambient temperature using a graduated cylinder. The half-life constituent measurements were made at ambient temperature using a graduated cylinder. The foam height, volume % air and half-life results are provided in the Table 1.

In the Table 1, Samples 1-3 are examples that display the foam height, percent volume air and half-life of samples that contain 7.5 gpt (gallons per thousand) of the synthetic polymer MaxPerm-20® having a viscosity of 15 cP, 5 gpt of the FAW™-1, FAW™-4 or FAW™-22 foaming agents, respectively, and air as a gas constituent.

Samples 4-6 are comparative examples that contain 5.0 gpt guar having a viscosity of 15 cP, 5 gpt of the foaming agent FAW™-1, FAW™-4 or FAW™-22, respectively, and air as a gas constituent. From Table 1, it may be seen that foamed fracturing fluid samples which contain the synthetic polymer demonstrate comparable and improved foam height, volume % air and half-life as the foamed fracturing fluid samples which contain guar at only a slightly higher loading level and a slightly lower viscosity than the synthetic polymer. From Table 1, it may further be seen that the foamed fracturing fluids which contain the synthetic polymer demonstrated improved foam height, volume % air and half-life properties when FAW™-4 or FAW™-22 were used as a foaming agent instead of FAW™-1.

TABLE 1

| Sample # | Composition | Foam Height (ml) | Volume Air (%) | Half-Life (min) |
|---|---|---|---|---|
| 1 | 7.5 gpt MaxPerm-20 ® (15 cP), 5 gpt FAW ™-1, air | 450 | 56 | 18 |
| 2 | 7.5 gpt MaxPerm-20 ® (15 cP), 5 gpt FAW ™-4, air | 730 | 73 | 44 |
| 3 | 7.5 gpt MaxPerm-20 ® (15 cP), 5 gpt FAW ™-22, air | 710 | 72 | 39 |
| 4* | 5 gpt guar (16.5 cP), 5 gpt FAW ™-1, air | 310 | 35 | 10 |
| 5* | 5 gpt guar (16.5 cP), 5 gpt FAW ™-4, air | 410 | 51 | 25 |
| 6* | 5 gpt guar (16.5 cP), 5 gpt FAW ™-22, air | 550 | 64 | 32 |

*Comparative Examples

Example 2

This example was conducted to demonstrate the apparent viscosity of a foamed fracturing fluid containing the synthetic polymer against pump time and flow rate and density. The polymer used in this example was 7.5 gpt of the synthetic polymer MaxPerm-20®. The carrier fluid was water. The foaming agent was a blend of 5 gpt FAW™-4 and 1 gpt Inflo™-250W, which is a flow-back agent commercially available from Baker Hughes, Incorporated. The gas constituent was nitrogen gas.

In this example, the rheological properties of the foamed fracturing fluid containing the synthetic polymer were measured using a foam flow loop apparatus ("Foam Loop"). The average viscosity at 40 and 100 (1/s) were calculated and reported. The foam flow loop comprises the following key elements: a mixing tank, a high pressure pump to move the fluid through the loop, a foam generating device where $CO_2$ and/or $N_2$ can be injected, a heating section where heat is applied to the fluid, a rheological section where viscosity is measured using pressure transducers and flow meters, a foam inspection device where the physical properties of the fluid can be observed, and a back-pressure regulator to keep the foam at high pressure. The volume % gas, flow rate and density were measured using the aforementioned equipment.

The foam stability of the foamed fracturing fluid was measured, or ranked, using a Foam Loop, which, as described above, allows for physical observation of the foam. The Foam Loop simulates downhole conditions to measure the rheology of the foam after exposure to the bottomhole temperature after selected time periods, such as 30, 60 or 90 minutes. In this example, the Foam Loop test was conducted for a period of 30 minutes in the absence of a crosslinking agent. All of the constituents of the foamed fracturing fluid are batch mixed to form a liquid phase and then the liquid phase was injected concomitantly with the $N_2$ gas constituent. The foam stability is ranked on a scale of from 1-10 based on visual inspection. A ranking of from 1-3 indicates a foam that has extreme gas breakout and slug flow throughout the test and is generally unsuitable for pumping. A ranking of from 4-7 indicates that the foam stability is moderate to good. A ranking of 8-10 is a foam that is very stable, homogenous, has very small bubble size comparable to the consistency of shaving cream and no gas breakout.

The average viscosity and other rheological property results are provided in the Table 2 and in FIG. 1.

TABLE 2

| Volume $N_2$ (%) | Average Viscosity at 40 s-1 (cP) | Average Viscosity at 100 s-1 (cP) | Foam Stability Rank |
|---|---|---|---|
| 70 | 181 | 97 | 7.5 |

FIG. 1 is a graph of the viscosity (in centipoise) measured at 40 rpm and 100 rpm, respectively, versus pump time (in minutes) and flow rate (lbm/min) and density (lbm/gal) at a temperature of 150° F.

From Table 2 and FIG. 1, it may be seen that the foamed fracturing fluid containing the synthetic polymer is highly stable, exhibiting very small bubble size and little to no gas breakout.

Example 3

This example was conducted to demonstrate the apparent viscosity of the foamed fracturing fluid of Example 2 against pump time and flow rate and density at a temperature of 120° F. instead of 150° F.

Figure 2:
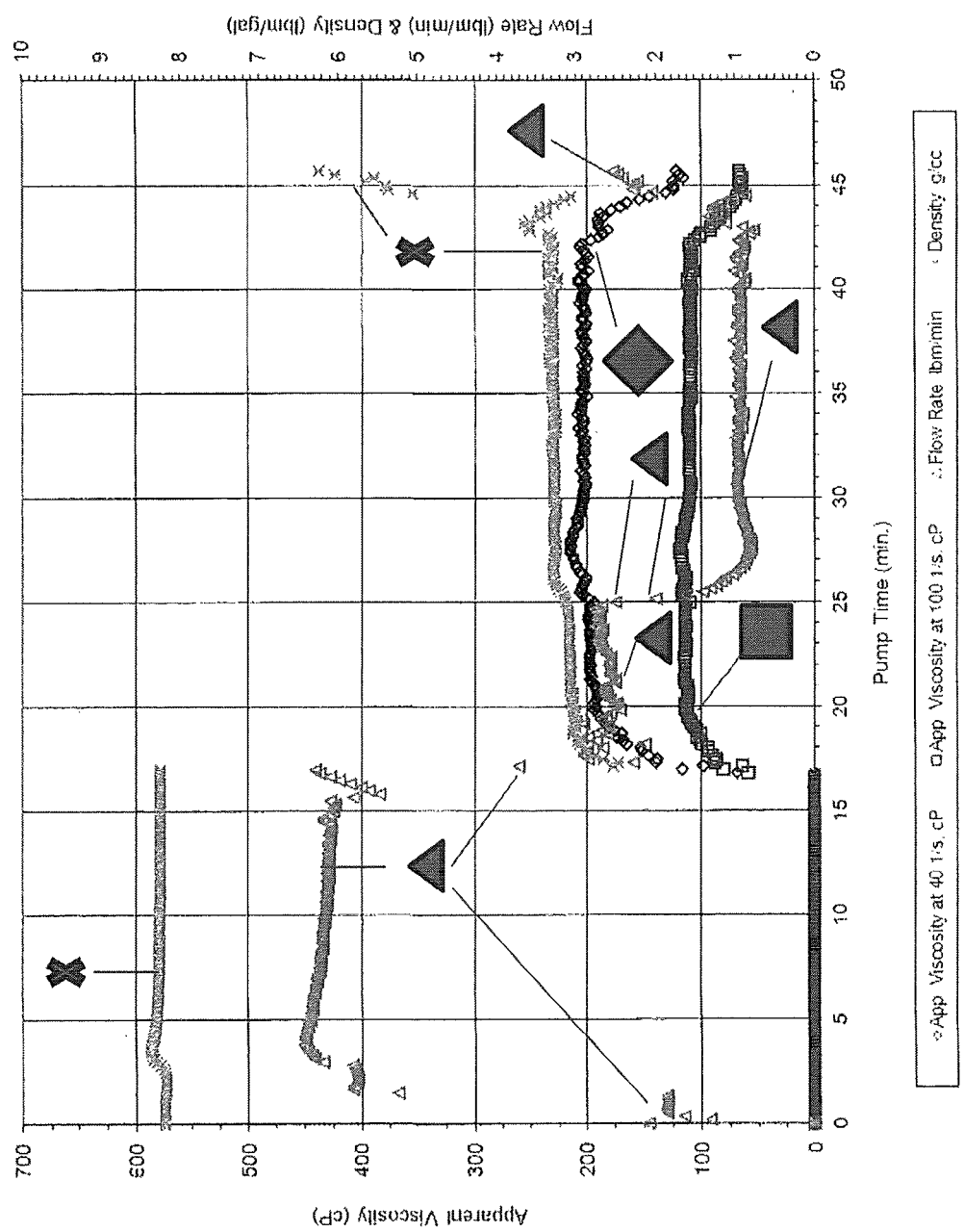
FIG. 2 is a graph depicting the average apparent viscosity versus time and flow rate and density at 120° F. for a foamed fracturing fluid which contains the synthetic polymer, the foaming agent and gas constituent which comprises nitrogen.

The average viscosity and other rheological property results are provided in Table 3 and in FIG. 2.

TABLE 3

| Volume $N_2$ (%) | Average Viscosity at 40 s-1 (cP) | Average Viscosity at 100 s-1 (cP) | Foam Stability Rank |
|---|---|---|---|
| 70 | 199 | 114 | 8.0 |

FIG. 2 is a graph of the viscosity (in centipoise) measured at 40 rpm and 100 rpm, respectively, versus pump time (in minutes) and flow rate (lbm/min) and density (lbm/gal) at a temperature of 120° F.

From Table 3 and FIG. 2, it may be seen that the foamed fracturing fluid containing the synthetic polymer at 120° F. exhibits even better rheological properties in comparison to Example 2, including improved average viscosity at 40 and 100 rpm, flow rate, density and foam stability.

Example 4

This example was conducted to demonstrate the apparent viscosity of the foamed fracturing fluid of Example 2 against pump time and flow rate and density at a temperature of 150° F. using carbon dioxide ($CO_2$) as a gas constituent instead of nitrogen.

Figure 3:
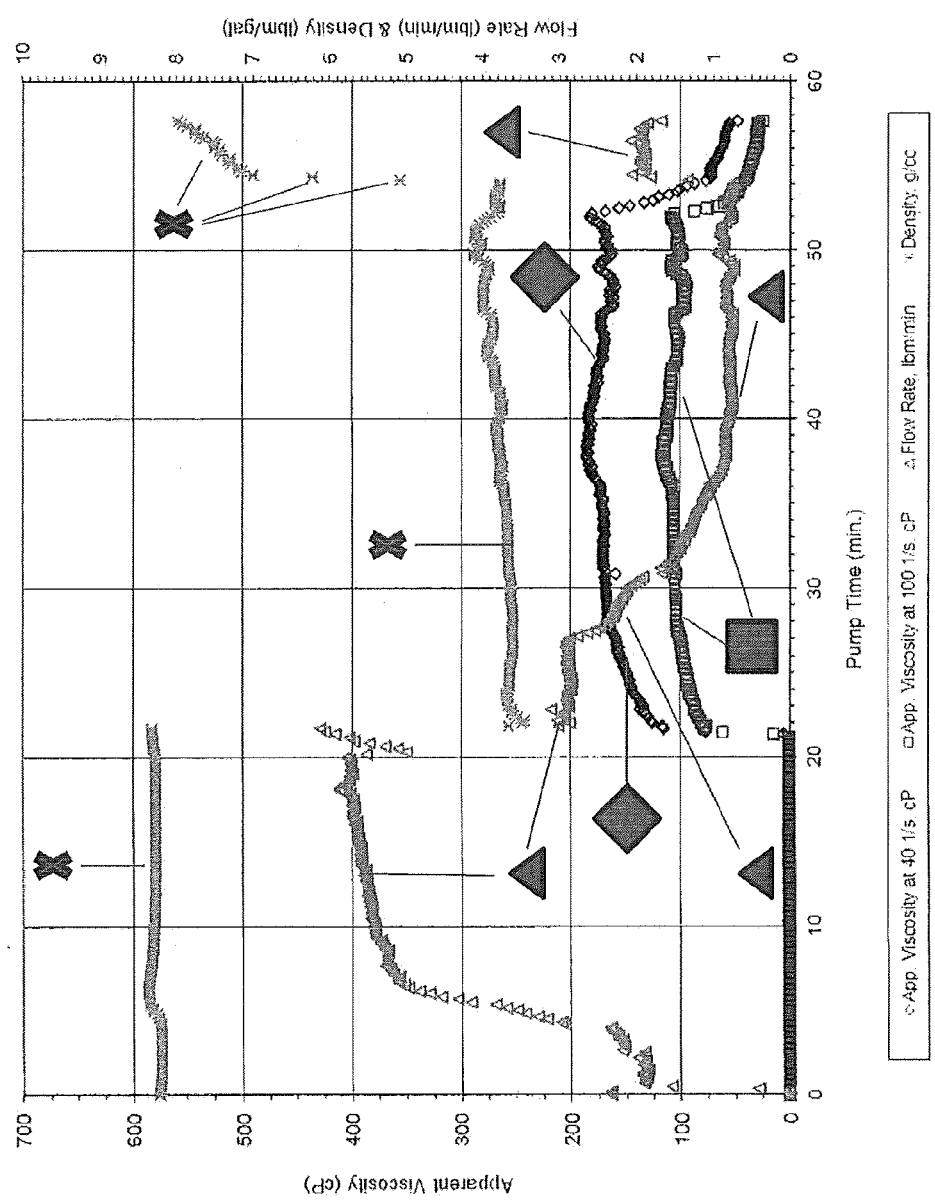
FIG. 3 is a graph depicting the average apparent viscosity versus time and flow rate and density at 150° F. for a foamed fracturing fluid which contains the synthetic polymer, the foaming agent and gas constituent which comprises carbon dioxide.

The average viscosity and other rheological property results are provided in Table 4 and in FIG. 3.

TABLE 4

| Volume CO$_2$ (%) | Average Viscosity at 40 s-1 (cP) | Average Viscosity at 100 s-1 (cP) | Foam Stability Rank |
|---|---|---|---|
| 70 | 173 | 106 | 7.0 |

FIG. 3 is a graph of the viscosity (in centipoise) measured at 40 rpm and 100 rpm, respectively, versus pump time (in minutes) and flow rate (Ibm/min) and density (Ibm/gal) at a temperature of 150° F.

From Table 4 and FIG. 3, it may be seen that the foamed fracturing fluid which utilizes carbon dioxide as a gas constituent instead of nitrogen exhibits a slightly reduced average viscosity and foam stability rank in comparison to Examples 2 and 3.

Example 5

This comparative example was conducted to demonstrate the apparent viscosity of the foamed fracturing fluid of Example 2 against pump time and flow rate and density at a temperature of 150° F. using nitrogen as a gas constituent in which the synthetic polymer has been replaced with 5 gpt of guar.

Figure 4:
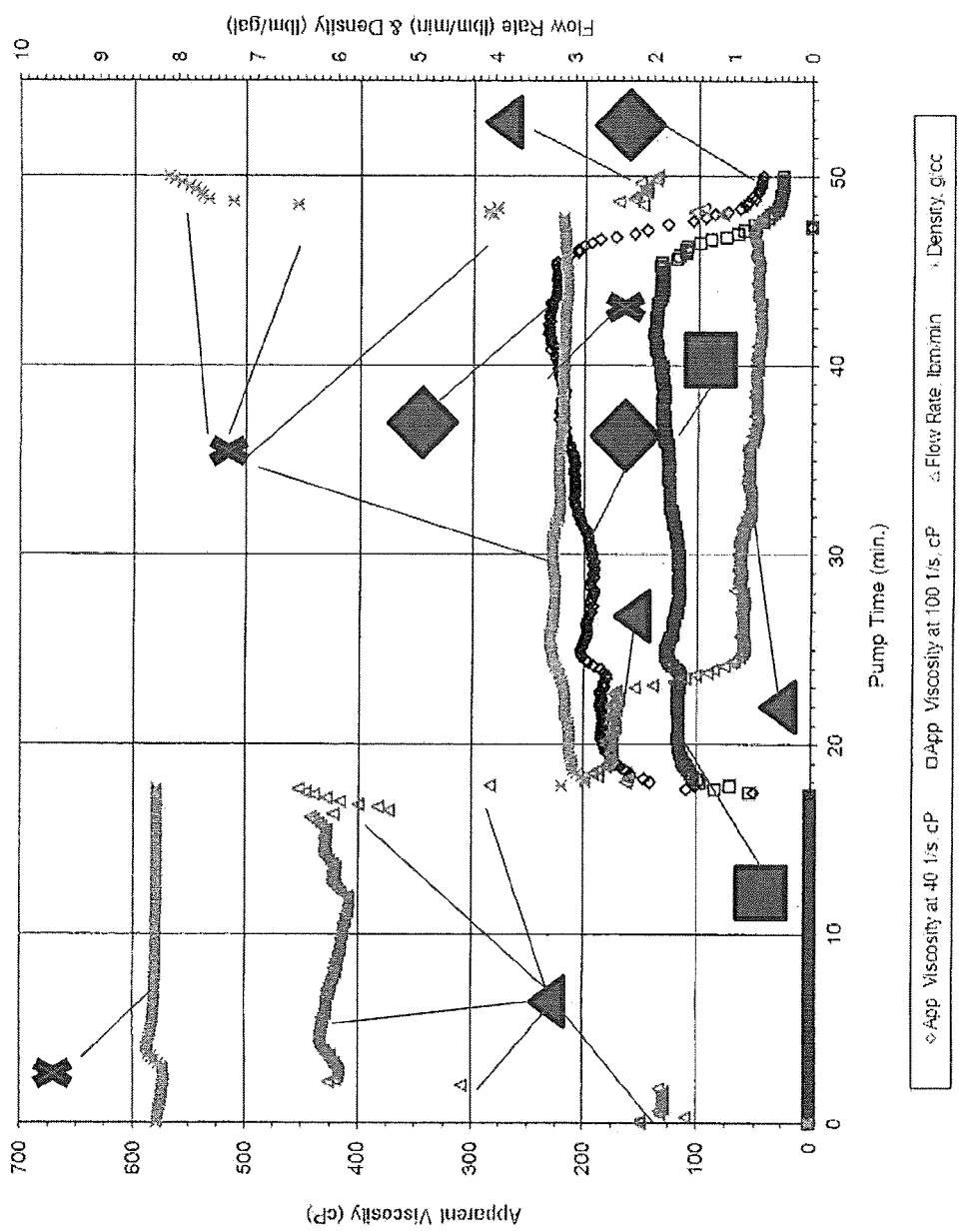
FIG. 4 is a graph depicting the average apparent viscosity versus time and flow rate and density at 150° F. for a foamed fracturing fluid which contains a guar polymer, the foaming agent and gas constituent which comprises nitrogen.

The average viscosity and other rheological property results are provided in Table 5 and in FIG. 4.

TABLE 5

| Volume N$_2$ (%) | Average Viscosity at 40 s-1 (cP) | Average Viscosity at 100 s-1 (cP) | Foam Stability Rank |
|---|---|---|---|
| 70 | 190 | 119 | 7.5 |

FIG. 4 is a graph of the viscosity (in centipoise) measured at 40 rpm and 100 rpm, respectively, versus pump time (in minutes) and flow rate (Ibm/min) and density (Ibm/gal) at a temperature of 150° F.

From Table 5 and FIG. 4, it may be seen that foamed fracturing fluids which utilize the synthetic polymer and foaming agent demonstrate rheological properties which are comparable to the rheological properties of a foamed fracturing fluid which utilizes guar instead of the synthetic polymer. The foamed fracturing fluids which contain the synthetic polymer, the foaming agent and the gas constituent thus demonstrate an average viscosity, flow rate, density and foam stability which is comparable to foamed fracturing fluids which contain guar, the foaming agent and the gas constituent.

The fracturing fluid may be used in a stimulation treatment, a fracturing treatment, an acidizing treatment, a friction reducing operation or a downhole completion operation. The fracturing fluid can be used as a gel or a slurry or a combination of at least one of the foregoing.

This invention may be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, the term "fracturing operation" shall include a stimulation treatment, a fracturing treatment, an acidizing treatment, a friction reducing operation or a completion operation, downhole, or the like.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The transition term "comprising" is inclusive of the transition terms "consisting of" and "consisting essentially of".

All numerical ranges included herein are interchangeable and are inclusive of end points and all numerical values that lie between the endpoints.

As used herein a "borehole" may be any type of well, including, but not limited to, a producing well, a non-producing well, an experimental well, an exploratory well, a well for storage or sequestration, and the like. Boreholes may be vertical, horizontal, some angle between vertical and horizontal, diverted or non-diverted, and combinations thereof, for example a vertical borehole with a non-vertical component.

The terms "decompose", "decomposition" and/or "degradable" refer to the conversion of materials into smaller components, intermediates, or end products.

The term and/or is used herein to mean both "and" as well as "or". For example, "A and/or B" is construed to mean A, B or A and B.

As used herein, the term "treatment" or "treating" refers to any hydrocarbon-bearing formation operation that uses a fluid in conjunction with a desired function or purpose. The term "treatment" or "treating" does not imply any particular action by the fluid or any particular constituent thereof.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for treating a hydrocarbon-bearing formation comprising:
   blending a carrier fluid with a polymer, a foaming agent and a gas constituent to form a foamed fracturing fluid, the foamed fracturing fluid having a viscosity of about 50 centipoise or greater at 100 s$^{-1}$; the polymer being a polyacrylamide further comprising a labile group or a polyacrylate further comprising a labile group, the labile group being operative to facilitate decomposition of the synthetic polymer upon activation of the labile group, and comprising ester groups, azo groups, disulfide groups, orthoester groups, acetal groups, etherester groups, ether groups, silyl groups, phosphazine groups, urethane groups, esteramide groups, etheramide groups, anhydride groups, or a combination thereof; and discharging the foamed fracturing fluid into a downhole fracture in the hydrocarbon-bearing formation;

adding an oxidizing agent to the foamed fracturing fluid, the oxidizing agent and the polymer being selected such that upon activation of the labile group, the viscosity of the foamed fracturing fluid is reduced to about 10 centipoise or less at 100 s$^{-1}$;

activating the labile group of the polymer with the oxidizing agent; and reducing the viscosity of the foamed fracturing fluid to about 10 centipoise or less at 100 s$^{-1}$ upon activation of the labile group of the polymer;

wherein the foamed fracturing fluid is operative to reduce friction during a hydrocarbon-bearing treatment operation and the synthetic polymer is devoid of guar.

2. The method for treating a hydrocarbon-bearing formation of claim 1, further comprising adding a reducing agent to the foamed fracturing fluid.

3. The method for treating a hydrocarbon-bearing formation of claim 2, wherein the reducing agent is sodium erythorbate, iron sulfate, oxalic acid, formic acid, ascorbic acid, erythorbic acid, a compound comprising a metal ion wherein the metal ion is a copper ion, an iron ion, a tin ion, a manganese ion or a sulfur ion, or a combination comprising at least one of the foregoing.

4. The method for treating a hydrocarbon-bearing formation of claim 2, wherein the oxidizing agent and the reducing agent are selected in such a way that the polymer is decomposed at a temperature much lower than that which would be accomplished by a fracturing fluid that contains either an oxidizing agent or a reducing agent but not both.

5. The method for treating a hydrocarbon-bearing formation of claim 2, wherein the weight ratio of the oxidizing agent to the reducing agent is about 1:1 to about 10:1.

6. The method for treating a hydrocarbon-bearing formation of claim 2, wherein the weight ratio of the oxidizing agent to the reducing agent is about 4:1 to about 12:1.

7. The method for treating a hydrocarbon-bearing formation of claim 1, wherein the oxidizing agent is an earth metal alkali oxidizing compound, a bromate oxidizing compound, or a combination comprising at least one of the foregoing.

8. The method for treating a hydrocarbon-bearing formation of claim 1, wherein the polymer is the polyacrylamide further comprising the labile group.

9. The method for treating a hydrocarbon-bearing formation of claim 1, wherein the viscosity of the carrier fluid is increased by about 100% to about 900% in about 10 to about 100 seconds upon introduction of the polymer to the carrier fluid.

10. The method for treating a hydrocarbon-bearing formation of claim 1, wherein the viscosity of the carrier fluid is increased by about 500% to about 800% in about 20 to about 90 seconds upon introduction of the polymer to the carrier fluid.

11. The method for treating a hydrocarbon-bearing formation of claim 1, wherein the polymer is present in an amount of about 0.1 wt. % to about 10 wt. %, based on the total weight of the foamed fracturing fluid.

12. The method for treating a hydrocarbon-bearing formation of claim 1, wherein the foamed fracturing fluid comprises the foaming agent in an amount of about 0.05 to about 5 volume %, based on the total weight of the foamed fracturing fluid.

13. The method for treating a hydrocarbon-bearing formation of claim 1, wherein the foamed fracturing fluid comprises the foaming agent in an amount of about 0.1 to about 2 volume %, based on the total weight of the foamed fracturing fluid.

14. The method for treating a hydrocarbon-bearing formation of claim 1, wherein a ratio of a volume of the gas constituent to a volume of the foamed fracturing fluid is greater than or equal to about 52%.

15. The method for treating a hydrocarbon-bearing formation of claim 1, wherein the polymer is present in an amount of about 0.05 wt. % to about 5 wt. %, based on the total weight of the fracturing fluid.

16. The method for treating a hydrocarbon-bearing formation of claim 1, wherein the solubility parameter of the polymer is within about 25% of the solubility parameter of the carrier fluid.

17. The method for treating a hydrocarbon-bearing formation of claim 1, wherein the carrier fluid is a slickwater having a viscosity of less than 3 centipoise.

18. The method for treating a hydrocarbon-bearing formation of claim 1, wherein the carrier fluid comprises an alkali metal salt, an alkali earth metal salt, or a combination thereof in an amount of from about 0.1 wt. % to about 10 wt. %, based on the total weight of the carrier fluid.

19. The method for treating a hydrocarbon-bearing formation of claim 1, wherein the oxidizing agent sodium bromate.

20. The method for treating a hydrocarbon-bearing formation of claim 1, wherein the oxidizing agent is included in the fracturing fluid in an amount of from about 0.005 wt. % to about 2 wt. % based on the total weight of the fracturing fluid.

21. The method for treating a hydrocarbon-bearing formation of claim 1, wherein the oxidizing agent is included in the fracturing fluid in an amount of from about 0.02 wt. % to about 1.2 wt. %, based on the total weight of the fracturing fluid.

22. The method for treating a hydrocarbon-bearing formation of claim 1, wherein the foaming agent is an olefinic sulfate, olefinic sulfonate, ethoxylated sulfate, cocoamidopropyl dimethyl ammonium acetate (betaine), coco betaine, butoxyethanol or a combination comprising at least one of the foregoing.

23. The method for treating a hydrocarbon-bearing formation of claim 1, wherein the foamed fracturing fluid further comprises at least one additive selected from the group consisting of emulsifiers, non-emulsifiers, breaker catalysts, clay stabilization agents, bacterial control agents or a combination comprising at least one of the foregoing.

24. The method for treating a hydrocarbon-bearing formation of claim 1, wherein the foamed fracturing fluid reaches its maximum viscosity when the fluid penetrates the fracture.

25. A method for treating a hydrocarbon-bearing formation comprising:

blending a carrier fluid with a polymer, a foaming agent and a gas constituent to form a foamed fracturing fluid, the foamed fracturing fluid having a viscosity of about 50 centipoise or greater at 100 s$^{-1}$; the polymer being a synthetic polymer further comprising a labile group that is operative to facilitate decomposition of the synthetic polymer upon activation of the labile group, the labile group comprising ester groups, carbonate groups, azo groups, disulfide groups, a derivative thereof or a combination thereof, the polymer being present in an amount of about 0.1 wt. % to about 10 wt. %, the foaming agent being present in an amount of about 0.05 to about 5 volume %, and the gas being present in an amount of about 20 to about 90 volume %, each based on the total weight of the foamed fracturing fluid;

adding a crosslinking agent to the foamed fracturing fluid to crosslink the polymer so that the foamed fracturing fluid has a viscosity of about 100 to about 2,500 centipoise at 100 $s^{-1}$; and discharging the foamed fracturing fluid into a downhole fracture in the hydrocarbon-bearing formation;

adding an oxidizing agent to the foamed fracturing fluid the oxidizing agent, and the polymer being selected such that upon activation of the labile group, the viscosity of the foamed fracturing fluid is reduced to about 10 centipoise or less at 100 $s^{-1}$;

activating the labile group of the polymer with the oxidizing agent; and reducing the viscosity of the foamed fracturing fluid to about 10 centipoise or less at 100 $s^{-1}$ upon activation of the labile group of the polymer;

wherein the foamed fracturing fluid is operative to reduce friction during a hydrocarbon-bearing treatment operation and the synthetic polymer is devoid of guar.

26. The method for treating a hydrocarbon-bearing formation of claim 25, wherein the crosslinking agent is added in an amount of about 0.01 wt. % to about 2 wt. %, based on the total weight of the foamed fracturing fluid.

27. The method for treating a hydrocarbon-bearing formation of claim 25, wherein the foamed fracturing fluid has a viscosity of about 300 to about 1,200 centipoise at 100 $s^{-1}$.

28. A method for treating a hydrocarbon-bearing formation comprising:

blending slickwater having a viscosity of less than about 3 centipoise with a foaming agent and a gas constituent, and an oxidizing agent to form a foamed fracturing fluid, the polymer being a polyacrylamide further comprising a labile group or a polyacrylate further comprising a labile group, the labile group comprising ester groups, amide groups, carbonate groups, azo groups, disulfide groups, orthoester groups, acetal groups, etherester groups, ether groups, silyl groups, phosphazine groups, urethane groups, esteramide groups, etheramide groups, anhydride groups, a derivative thereof, or a combination thereof, the polymer being present in an amount of about 0.1 wt. % to about 10 wt. %, the foaming agent being present in an amount of about 0.05 to about 5 volume %, the gas being present in an amount of about 20 to about 90 volume %, and the oxidizing agent is included in the fracturing fluid in an amount of from about 0.005 wt. % to about 2 wt. %, each based on the total weight of the foamed fracturing fluid, and the foamed fracturing fluid having a viscosity of about 50 centipoise or greater at 100 $s^{-1}$ during injection;

injecting the foamed fracturing fluid into the hydrocarbon-bearing formation the foamed fracturing fluid having a viscosity of about 50 centipoise or greater at 100 $s^{-1}$ during injection;

discharging the foamed fracturing fluid into a downhole fracture in the hydrocarbon-bearing formation, activating the labile group of the polymer with the oxidizing agent; the oxidizing agent and the polymer being selected such that upon activation of the labile group, the viscosity of the foamed fracturing fluid is reduced to about 10 centipoise or less at 100 $s^{-1}$;

decomposing the polymer upon activation of the labile group to provide a decomposed polymer; and removing the decomposed polymer;

wherein the foamed fracturing fluid is operative to reduce friction during a hydrocarbon-bearing treatment operation and the synthetic polymer is devoid of guar.

* * * * *